US006401740B2

(12) United States Patent
Zaiser

(10) Patent No.: US 6,401,740 B2
(45) Date of Patent: Jun. 11, 2002

(54) PERMANENT LABEL FOR GAS FLOW DEVICES

(75) Inventor: LeNoir E. Zaiser, Naples, FL (US)

(73) Assignee: Inovo, Inc., Naples, FL (US)

(*) Notice: Subject to any disclaimer, the term of this patent is extended or adjusted under 35 U.S.C. 154(b) by 0 days.

(21) Appl. No.: 09/795,041

(22) Filed: Feb. 26, 2001

Related U.S. Application Data

(60) Provisional application No. 60/185,889, filed on Feb. 29, 2000.

(51) Int. Cl.[7] .......... F16K 31/12

(52) U.S. Cl. .......... 137/1; 40/625; 40/630; 137/505; 137/551

(58) Field of Search .......... 137/505–551, 137/552; 40/625, 630, 631, 632

(56) References Cited

U.S. PATENT DOCUMENTS

| | | | | | |
|---|---|---|---|---|---|
| 2,909,191 | A | * | 10/1959 | Horton | 137/501 |
| 3,768,185 | A | * | 10/1973 | Sternberg | 220/8 |
| 4,389,063 | A | | 6/1983 | Ryan | 292/307 R |
| 4,655,246 | A | * | 4/1987 | Phlipot et al. | 137/505.11 |
| 5,369,900 | A | * | 12/1994 | Garrison | 40/590 |
| 5,422,167 | A | | 6/1995 | Robertson et al. | 428/195 |
| 5,484,099 | A | | 1/1996 | Robertson et al. | 228/176 |
| 5,687,622 | A | | 11/1997 | Gerhardt | 76/107.1 |
| 5,711,836 | A | * | 1/1998 | Hill | 156/215 |
| 5,735,436 | A | | 4/1998 | Schroeder et al. | 222/129.1 |
| 5,762,796 | A | | 6/1998 | Zraik | 210/493.1 |
| 5,766,795 | A | | 6/1998 | Will et al. | 429/167 |
| 5,773,386 | A | | 6/1998 | Langan | 503/226 |
| 5,916,335 | A | | 6/1999 | Gerhardt | 76/107.1 |
| 6,058,636 | A | * | 5/2000 | Colkmire | 215/232 |

FOREIGN PATENT DOCUMENTS

| | | |
|---|---|---|
| DE | 39 39 575 A 1 | 6/1991 |

* cited by examiner

*Primary Examiner*—Stephen M. Hepperle
(74) *Attorney, Agent, or Firm*—Hamilton, Brook, Smith & Reynolds, P.C.

(57) ABSTRACT

A label is manufactured for permanent mounting to a gas flow regulator. The label is made from a material having a surface that can be permanently colored with a color layer and permanently etched, such as an aluminum alloy. The color layer can be anodized with a color layer to various colors. The etching can includes an etched bar code, which is readable by typical bar code readers, or an etched design. The label is formed as a continuous walled structure, such as a cylindrical tube.

39 Claims, 3 Drawing Sheets

PERMANENT LABEL FOR GAS FLOW DEVICES

RELATED APPLICATION

This application claims the benefit of U.S. Provisional Application No. 60/185,889, filed on Feb. 29, 2000, the entire teachings of which are incorporated herein by reference.

BACKGROUND

Gas flow regulators are used to provide a medical gas, such as oxygen, to a patient from a source supply of the gas. The gas is normally stored in a cylinder or supply vessel under high pressure. The gas flow regulator reduces the high pressure (about 500–3000 psi) to a lower pressure (about 50 p.s.i.) and provides the gas at a metered flow rate, usually measured in liters/minute. It is desirable to manufacture gas flow regulators as a compact, light weight and smooth to the touch package. It is also desirable to color code the devices to indicate the gas being handled (e.g., green for oxygen) or the preference of the owner of the device. Furthermore, the use of bar coding can facilitate accurate tracking and identification of the devices.

One solution to the prior art problem is to manufacture regulators having an aluminum alloy housing. Aluminum can be milled into a suitable shape for use as a regulator. The aluminum can also be color anodized and etched. Unfortunately, the use of aluminum in the flow path of oxygen is believed to be a potential fire hazard, because aluminum can be ignited when exposed to a pure oxygen environment.

Unlike aluminum, brass is resistant to ignition. It is therefore desirable to manufacture compact gas flow regulators from a brass material.

While a brass regulator can also be compact, lightweight and smooth to the touch, the use of brass as a construction material does provide some disadvantages. Etching of the bar code onto a brass regulator, although permanent, is not a viable option because typical bar code scanners cannot read etched brass. Another disadvantage involves color coding. Brass regulators can typically be plated only with nickel, which limits the coloring of the brass regulators to a metallic color. Typical bar code readers also cannot read etched nickel.

Although adhesive labels made from a thin paper or plastic material can be used for the color coding and bar coding, they can be removed or can wear off the regulator.

SUMMARY

In accordance with embodiments of the invention, an essentially permanent label can be attached to the body of a flow regulator. The label can be as durable as the regulator body. The label can also be attached in such a way as to inhibit removal of the label without physical damage to the regulator or label.

In a particular embodiment, a regulator attaches to a fluid source, such as a gas supply source, and control includes elements that the flow of fluid from the fluid source. The regulator includes housing that can be formed of a first material. The regulator can also include a label formed of a second material, where the label is non-removably mounted to the housing.

The label can be formed of a continuous walled structure, such as a cylinder. The label for a regulator can include an inner surface for mounting to the regulator. The label and housing can also include an attachment mechanism for securing the label to the housing. The attachment mechanism can include a pressure fit or an adhesive such as epoxy, for example.

The label can further include a permanently etchable surface for inclusion of an etched design, such as a bar code. The label can also include a permanently colorable surface for inclusion of a color layer. The color layer can be formed of an anodized material. Specifically, the second material of the label can be an aluminum alloy.

The label can also include an orifice that, when the label is attached, coaxially aligns with a relief vent on the housing. The relief vent is particularly fabricated to eject overpressured fluid from the relief vent, which may result from a flame-out. The orifice is dimensional to decrease the likelihood that the label would be contacted, and possibly ignited, by a flame or hot gas ejected from the relief vent. This is especially important when the label is fabricated from an ignitable material, such as aluminum.

BRIEF DESCRIPTION OF THE DRAWINGS

The objects, features and advantages of a permanent label for a gas flow device will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
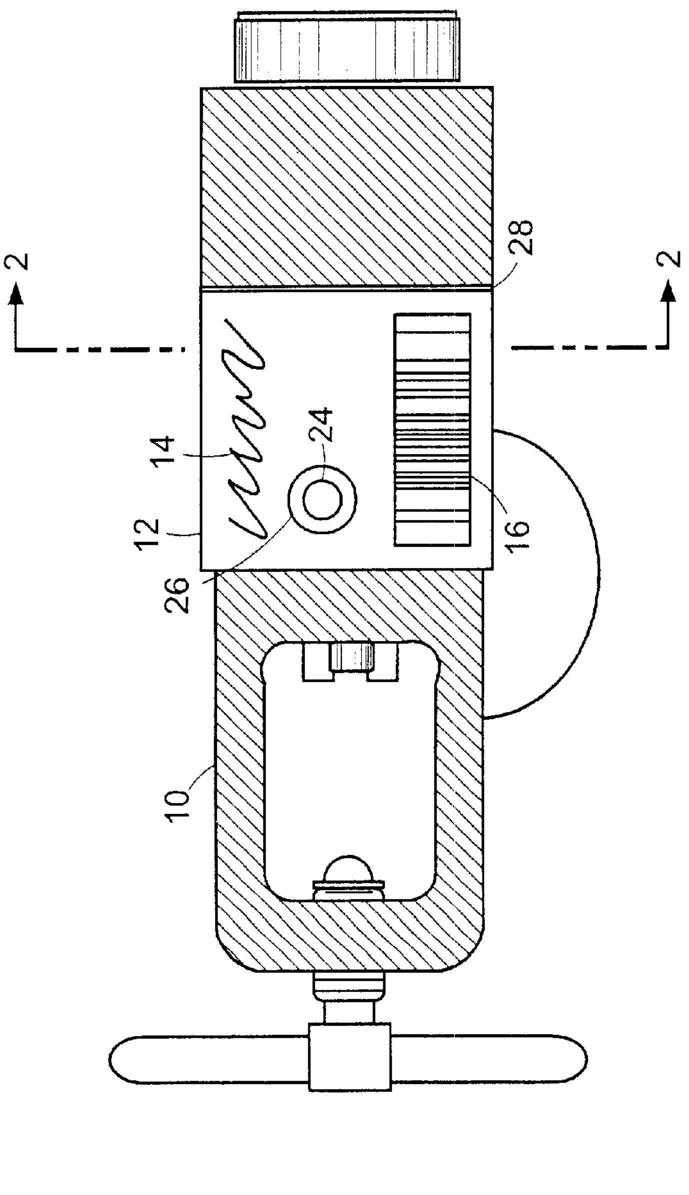
FIG. 1 illustrates an embodiment of a gas flow regulator having a permanent label.

FIG. 1 illustrates an embodiment of a gas flow regulator 10 having a permanent label 12. The label 12 is manufactured from a material having a surface that can be permanently colored with a color layer and permanently etched.

The label 12 is preferably formed from an aluminum alloy. Aluminum can be readily anodized with a color layer to various colors. The use of colored regulator labels can be more visually appealing than a non-colored label. The use of differently colored regulator labels 12 can also aid in identifying the regulator 10 as being produced by a particular manufacturer or as belonging to a particular entity or group. Preferably, the color layer is formed on the entire outer surface of the label 12. By coloring the entire outer surface of the label 12, the label 12 can be identified by color from any perspective. With external coloring of the entire surface of the label 12 a user does not have to adjust the position of the regulator 10 to determine its color code. Differently colored regulator labels 12 can also correspond to color codes which, in turn, can identify a particular type of gas regulated by the regulator 10. The color of the label can also be permanent or durable.

As stated, an aluminum label 12 can be anodized to various colors. The anodized coloring resists fading and has a higher wear resistance than paint, for example, which can fade and chip. The durability of the color can allow for proper identification of the gasses contained by a particular regulator 10 and allow for tracking of the regulator 10 over the operational life of the device. This identification can be particularly important for identifying regulators dedicated to oxygen use, which must be specifically cleaned.

Also, aluminum can be etched to include logos or other designs 14 or bar codes 16. A bar code 16 etched into anodized aluminum can be read by typical bar code readers.

Figure 2:
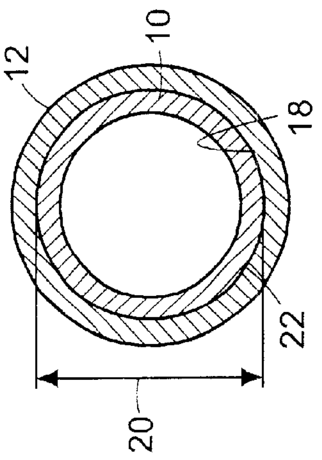
FIG. 2 shows a cross sectional view of the gas flow regulator and label, as illustrated in FIG. 1.
Figure 4:
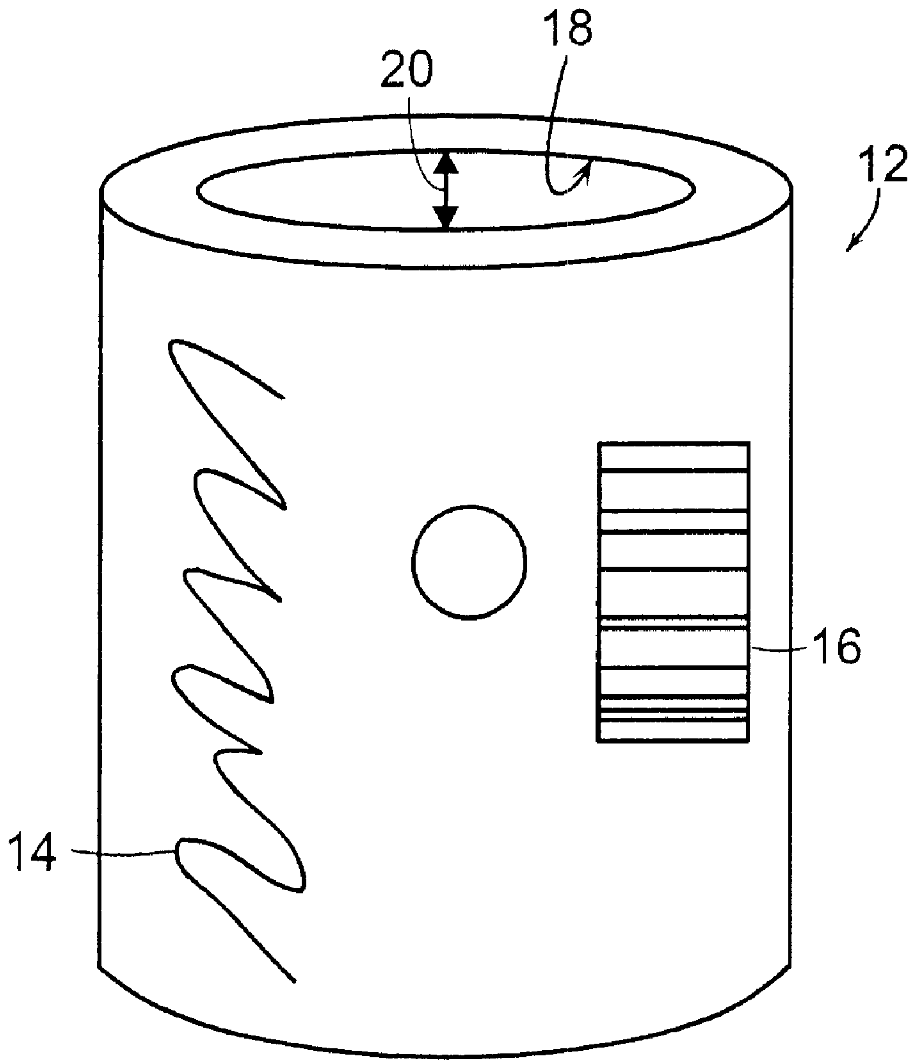
FIG. 4 shows a perspective view of a label.

As illustrated in FIG. 2 and FIG. 4, the label 12 is formed as a continuous walled structure, such as a cylindrical tube or collar. The continuous walled structure is formed of a single piece of material and does not include a seam or joint, as formed by rolling a flat structure into a cylindrical shape. In this embodiment, the label 12 has an inner surface 18 and an inner diameter 20. The inner surface 18 of the cylindrical tube label 12 is mounted over an outer surface 22 of the gas flow regulator 10, as shown along the A—A' axis in FIG. 2.

Figure 3:
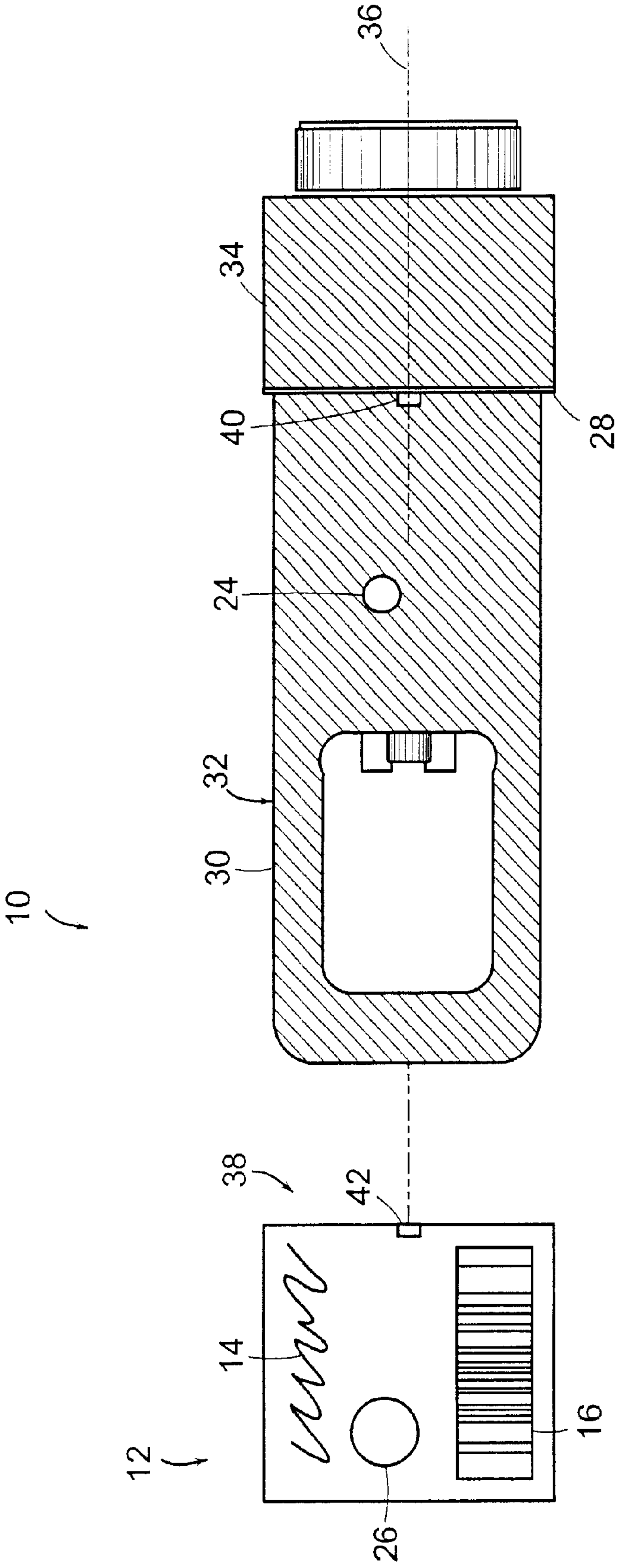
FIG. 3 illustrates an assembly view of the gas flow regulator and label.

FIG. 3 illustrates an assembly view of the gas flow regulator 10 and label 12. The housing 30 of the gas flow regulator 10 is formed to allow the label 12 to mount over the outer surface 22 of the regulator 10. The housing 30 includes a first diameter portion 32 and a second diameter portion 34. The first diameter portion 32 has a diameter that is smaller than the inner diameter 20 of the label 12, thereby allowing the label 12 to slide and mount onto the housing 10. The second diameter portion 34 has a diameter greater than the first diameter portion 32. The interface between the first 32 and second 34 diameter portions forms a step 28. During assembly, the step 28 aids in positioning the label 12 in a particular location along the long axis 36 of the gas flow regulator 10. The step 28 and label 12 can also include a mating attachment 38 such as a notch 42 or opening and a key 40 or protrusion. The mating attachment 38 aids in aligning the label 12 in a particular orientation with respect to the circumference of the regulator 10. This orientation can align a relief vent 24 on the regulator 10 with a label hole 26 on the label 12.

As discussed with respect to FIG. 1, the label 12 can include etched designs 14. The etched designs 14 can be used to identify the manufacturing source of the regulator 10. For example, the etched designs 14 can include a part number, serial number or a manufacturer logo. As shown, the label 12 includes an etched bar code 16. The etched designs 14 and etched bar code 16 can be created by laser etching the label 12. The etching of the label 12 can also be permanent or durable. Once the label is etched with designs or with a bar code, it can be difficult to remove or alter the etchings under normal wear conditions. Such permanence or durability of the etching can allow the proper identification and tracking of the regulators 10 during the operational life of the regulator.

The label 12 also has the characteristic of permanence. For example, the label 12 can be permanently mounted to the gas flow regulator 10, such as by a pressure fit onto the regulator 10. The label 12 can also be mechanically attached to the regulator 10 using a set screw. Alternatively, the label 12 can be adhered to the regulator 10 using an epoxy, for example. Such mounting can prevent the label 12 from moving relative to the regulator 10 and can limit the possible removal of the label. The permanence of the label can ensure that the gas flow regulator is properly identified or monitored during its lifetime.

The permanence of the label is enhanced by its durability. The label 12 itself is manufactured from a durable material. For example, the material that forms the label 12 can be a metal alloy. A properly chosen material, for use as a label 12, may withstand corrosion, extremes in temperature and intentional and accidental tampering. In particular, the label 12 remains durable in its intended theater of operation, such as a medical environment. Such durability allows use of the label 12 on the regulator 10 for the life of the regulator.

Returning to FIG. 1, the regulator 10 includes a high pressure relief vent 24. The label 12 can have a label hole 26 which aligns substantially coaxially with the relief vent 24. In the event of a fire inside the regulator 10, any flame would be ejected through the relief vent 24. As illustrated, the label hole 26 has a larger diameter than the diameter of the relief vent 24. The diameter of the label hole 26 is chosen so as to inhibit any flame ejected from the regulator from contacting the aluminum label 12, thereby reducing the chance that the aluminum label 12 could ignite.

A particular embodiment of a gas flow regulator incorporating a permanent label is commercially available from Inovo, Inc. of Naples, Fla. While the label has been particularly shown and described with references to particular embodiments thereof, it will be understood by those skilled in the art that various changes in form and details may be made therein without departing from the scope of the invention.

What is claimed is:

1. A fluid flow regulator comprising:

a housing attachable to a fluid source; and a label essentially permanently mounted to the housing, the label having a continuous walled structure.

2. The regulator of claim 1 wherein the label comprises an aluminum alloy.

3. The regulator of claim 1 further comprising an attachment mechanism for securing the label to the housing.

4. The regulator of claim 1 wherein the label comprises a permanently etchable surface.

5. The regulator of claim 4 wherein the label comprises an etched design.

6. The regulator of claim 5 wherein the etched design comprises a bar code.

7. The regulator of claim 1 wherein the label comprises a permanently colorable surface.

8. The regulator of claim 7 wherein the label comprises a color layer.

9. The regulator of claim 8 wherein the color layer comprises an anodized material.

10. The regulator of claim 8 wherein the color layer is formed on an entire outer surface of the label.

11. The regulator of claim 1 wherein the label further comprises an outlet port, the outlet port aligned with a relief vent on the housing.

12. A fluid flow regulator comprising:

a housing attachable to a fluid source; and a label mounted to the housing, the label having a continuous walled structure and a permanently etchable surface.

13. The regulator of claim 12 wherein the label comprises an aluminum alloy.

14. The regulator of claim 12 further comprising an attachment mechanism for securing the label to the housing.

15. The regulator of claim 12 wherein the label comprises an etched design.

16. The regulator of claim 15 wherein the etched design comprises a bar code.

17. The regulator of claim 12 wherein the label further comprises an outlet port, the outlet port aligned with a relief vent on the housing.

18. A fluid flow regulator comprising:

a housing attachable to a fluid source; and a label mounted to the housing, the label having a continuous walled structure and the label having a permanently colorable surface.

19. The regulator of claim 18 wherein the label comprises an aluminum alloy.

20. The regulator of claim 18 further comprising an attachment mechanism for securing of the label to the housing.

21. The regulator of claim 18 wherein the label comprises a color layer.

22. The regulator of claim 21 wherein the color layer comprises an anodized material.

23. The regulator of claim 21 wherein the color layer is formed on an entire outer surface of the label.

24. The regulator of claim 18 wherein the label further comprises an outlet port, the outlet port aligned with a relief vent on the housing.

25. A label for a gas flow regulator, the label comprising:

a label body having a continuous walled structure, an inner surface mountable to a regulator, and an outer, permanently etchable, surface.

26. The label of claim 25 wherein the label body comprises an aluminum alloy.

27. The label of claim 25 further comprising an attachment mechanism for securing of the label to a regulator housing.

28. The label of claim 25 wherein the outer surface comprises an etched design.

29. The label of claim 28 wherein the etched design comprises a bar code.

30. The label of claim 25 wherein the label body further comprises an outlet port therethrough, the outlet port alignable with a relief vent of the regulator.

31. A label for a fluid flow regulator comprising:

a label body having a continuous walled structure, an inner surface mountable to a regulator, and an outer, permanently colorable, surface.

32. The label of claim 31 wherein the label body comprises an aluminum alloy.

33. The label of claim 31 further comprises an attachment mechanism for securing the label to the housing.

34. The label of claim 31 wherein the outer surface comprises a color layer.

35. The label of claim 34 wherein the color layer comprises an anodized material.

36. The label of claim 31 wherein the color layer is formed on the entire outer surface of the label.

37. The label of claim 31 wherein the label further comprises an outlet port, the outlet port aligned with a relief vent on the regulator.

38. A method for attaching a label to a fluid flow regulator comprising:

providing a regulator formed of a first material;

providing a continuously walled label having a surface allowing for coloring or etching of the label; and permanently mounting the label to the regulator.

39. A gas flow regulator comprising:

a housing attachable to a fluid source, the housing having a plurality of gas flow elements for controlling the flow of fluid from the source, the housing fabricated to include a relief vent and a step;

a label mounted to the housing and abutting the step, the label having a continuous walled structure, a label hole alignable with the relief vent and a permanently colorable and permanently etchable surface.

* * * * *